United States Patent
Fiala et al.

(10) Patent No.: US 10,274,034 B2
(45) Date of Patent: Apr. 30, 2019

(54) WEAR LINER WITH INTEGRATED TORQUE BUTTON

(71) Applicant: GOODRICH CORPORATION, Charlotte, NC (US)

(72) Inventors: Robert Fiala, Spokane, WA (US); Gary C. Riebe, Tipp City, OH (US); Matthew R. O'Neil, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/648,074

(22) Filed: Jul. 12, 2017

(65) Prior Publication Data

US 2019/0017562 A1  Jan. 17, 2019

(51) Int. Cl.
| | |
|---|---|
| F16D 65/12 | (2006.01) |
| F16D 69/04 | (2006.01) |
| F16D 69/02 | (2006.01) |
| F16D 55/36 | (2006.01) |
| F16D 55/00 | (2006.01) |
| F16D 65/02 | (2006.01) |

(52) U.S. Cl.
CPC ......... *F16D 69/0408* (2013.01); *F16D 55/36* (2013.01); *F16D 65/122* (2013.01); *F16D 65/126* (2013.01); *F16D 69/023* (2013.01); *F16D 2055/0058* (2013.01); *F16D 2065/1324* (2013.01); *F16D 2069/0433* (2013.01)

(58) Field of Classification Search
CPC .. F16D 65/122; F16D 65/126; F16D 69/0408; F16D 69/023; F16D 55/36
See application file for complete search history.

(56) References Cited

U.S. PATENT DOCUMENTS

| | | | |
|---|---|---|---|
| 3,613,851 A | 10/1971 | Ely et al. | |
| 3,685,623 A * | 8/1972 | Bradshaw | F16D 65/122 188/218 XL |
| 3,724,623 A * | 4/1973 | Thrower | F16D 65/121 192/107 R |
| 3,747,712 A | 7/1973 | Stout | |
| 3,857,469 A | 12/1974 | Stimson | |
| 4,076,106 A * | 2/1978 | Bermingham | F16D 65/122 188/250 G |
| 4,276,969 A * | 7/1981 | Chin | F16D 65/122 188/218 XL |
| 5,558,186 A * | 9/1996 | Hyde | F16D 55/40 188/218 XL |

(Continued)

FOREIGN PATENT DOCUMENTS

| | | |
|---|---|---|
| FR | 2977288 | 1/2013 |
| GB | 2488654 | 9/2012 |

OTHER PUBLICATIONS

European Patent Office, European Search Report dated Dec. 13, 2018 in Application No. 18183277.5.

*Primary Examiner* — Vishal R Sahni
(74) *Attorney, Agent, or Firm* — Snell & Wilmer, L.L.P.

(57) ABSTRACT

A friction disk may comprise a friction disk core and a wear liner coupled to the friction disk core. A depression may be formed in a surface of the friction disk core. The wear liner may comprise a protrusion extending from a non-wear surface of the wear liner. The protrusion may be positioned within the depression of the friction disk core.

15 Claims, 7 Drawing Sheets

(56) References Cited

U.S. PATENT DOCUMENTS

| | | | |
|---|---|---|---|
| 5,709,288 A * | 1/1998 | Riebe | F16D 65/122 |
| | | | 188/218 XL |
| 5,769,185 A * | 6/1998 | Main | F16D 65/126 |
| | | | 188/18 A |
| 5,779,006 A | 7/1998 | Hyde et al. | |
| 5,992,577 A | 11/1999 | Bugatti | |
| 6,241,055 B1 | 6/2001 | Daudi | |
| 6,318,511 B1 | 11/2001 | Bugatti | |
| 7,090,057 B2 * | 8/2006 | Fryska | F16D 65/12 |
| | | | 188/18 A |
| 7,766,133 B2 | 8/2010 | Cress | |
| 7,900,751 B2 | 3/2011 | Walker et al. | |
| 8,573,369 B2 | 11/2013 | Scelsi et al. | |
| 8,789,665 B2 | 7/2014 | Gilboy et al. | |
| 9,360,063 B2 | 6/2016 | Chambard et al. | |
| 2005/0011706 A1 | 1/2005 | Johnson | |
| 2007/0193836 A1 | 8/2007 | Walker et al. | |
| 2008/0041674 A1 | 2/2008 | Walker et al. | |
| 2008/0272235 A1 | 11/2008 | Cress et al. | |
| 2010/0025164 A1 | 2/2010 | Bingham et al. | |
| 2011/0220763 A1 | 9/2011 | Enright | |
| 2014/0224604 A1 | 8/2014 | Arbesman | |

* cited by examiner

WEAR LINER WITH INTEGRATED TORQUE BUTTON

FIELD

The present disclosure relates to aircraft braking systems and, in particular, to wear liners for friction disks.

BACKGROUND

Aircraft brake systems typically employ a series of friction disks forced into contact with each other to stop the aircraft. Friction disks splined to a non-rotating wheel axle are interspersed with friction disks splined to the rotating wheel. The friction disks withstand and dissipate the heat generated from contact between one another during braking. Current disk assemblies may comprise replaceable wear liners coupled to a reusable core. The liner may be attached to the core via a flange disposed at either an outer diameter of the liner for rotor assemblies or an inner diameter of the liner for stator assemblies. Attaching the liners via a flange can present torque transfer problems, particularly, when the liner is in a worn state. In addition, attaching the liner at a flange may increase material costs and material waste, as a large area of liner tends to be dedicated to the flange and the amount of wearable surface is limited.

SUMMARY

A friction disk is disclosed, in accordance with various embodiments. A friction disk may comprise a friction disk core comprising a first depression in a first surface of the friction disk core and a second depression in a second surface of the friction disk core opposite the first surface. A first wear liner may be coupled to the first surface of the friction disk core and may comprise a first protrusion extending from a first non-wear surface of the first wear liner. The first protrusion may be positioned within the first depression. A second wear liner may be coupled to the second surface of the friction disk core and may comprise a second protrusion extending from a second non-wear surface of the second wear liner. The second protrusion may be positioned within the second depression.

In various embodiments, a fastener may extend from the first wear liner to the second wear liner. A first head of the fastener may be recessed with respect to a first wear surface of the first wear liner. A second head of the fastener opposite the first head may be recessed with respect to a second wear surface of the second wear liner. The fastener may be located through the first protrusion. In various embodiments, a sidewall of the first protrusion may be formed at angle between 90° and 155° relative to the first non-wear surface. The friction disk core may comprise a first material, and the first wear liner may comprise a second material different from the first material.

In various embodiments, the friction disk core may comprise a rotor core. In various embodiments, the friction disk core may comprise a stator core. A thickness of the first wear liner extending from the first wear surface to the first non-wear surface may be between 0.05 inches and 0.15 inches.

A multi-disk brake system is disclosed, in accordance with various embodiments. A multi-disk brake system may comprise a first friction disk and a second friction disk. The first friction disk may comprise a first friction disk core comprising a plurality of first depressions in a first surface of the first friction disk core. A first wear liner may be coupled to the first surface of the first friction disk core and may comprise a plurality of first protrusions extending from a first non-wear surface of the first wear liner. The plurality of first protrusions may be positioned within the plurality of first depressions. The second friction disk may comprise a second friction disk core comprising a plurality of second depressions in a second surface of the second friction disk core. A second wear liner may be coupled to the second surface of the second friction disk core and may comprise a plurality of second protrusions extending from a second non-wear surface of the second wear liner. The plurality of second protrusions may be positioned within the plurality of second depressions.

In various embodiments, a fastener may couple the first wear liner to the first friction disk core. A head of the fastener may be recessed with respect to a wear surface of the first wear liner. The fastener may be located through a first protrusion of the plurality of first protrusions. The plurality of first protrusions may be formed in a circumferentially symmetric configuration along the first non-wear surface. The first friction disk core may further comprise a first portion radially outward from an outer circumferential surface of the first wear liner. The second friction disk core may further comprise a second portion radially inward from an inner circumferential surface of the second wear liner.

The first friction disk may comprise a rotor and the second friction disk may comprise a stator, The first wear liner and the second wear liner may be interchanged between the first friction disk core and the second friction disk core. A usable material volume of the first wear liner may be between 50% and 70% of a total material volume of the first wear liner in an unworn state.

A method of making a friction disk is disclosed, in accordance with various embodiments. The method may comprise forming a first depression in a first surface of a friction disk core, and coupling a first wear liner to the friction disk core. The first wear liner may comprise a first protrusion extending from a first non-wear surface of the first wear liner and positioned within the first depression.

In various embodiments, the method may further comprise forming a second depression in a second surface of the friction disk core opposite the first surface of the friction disk core, and coupling a second wear liner to the friction disk core. The second wear liner may comprise a second protrusion extending from a second non-wear surface of the second wear liner and positioned within the second depression. Coupling the first wear liner to the friction disk core and coupling the second wear liner to the friction disk core may comprise disposing a fastener through the first protrusion and the second protrusion. A first head of the fastener may be recessed with respect to a first wear surface of the first wear liner, and a second head of the fastener opposite the first head of the fastener may be recessed with respect to a second wear surface of the second wear liner.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 1 illustrates a multi-disk brake system, in accordance with various embodiments;

DETAILED DESCRIPTION

Figure 1:
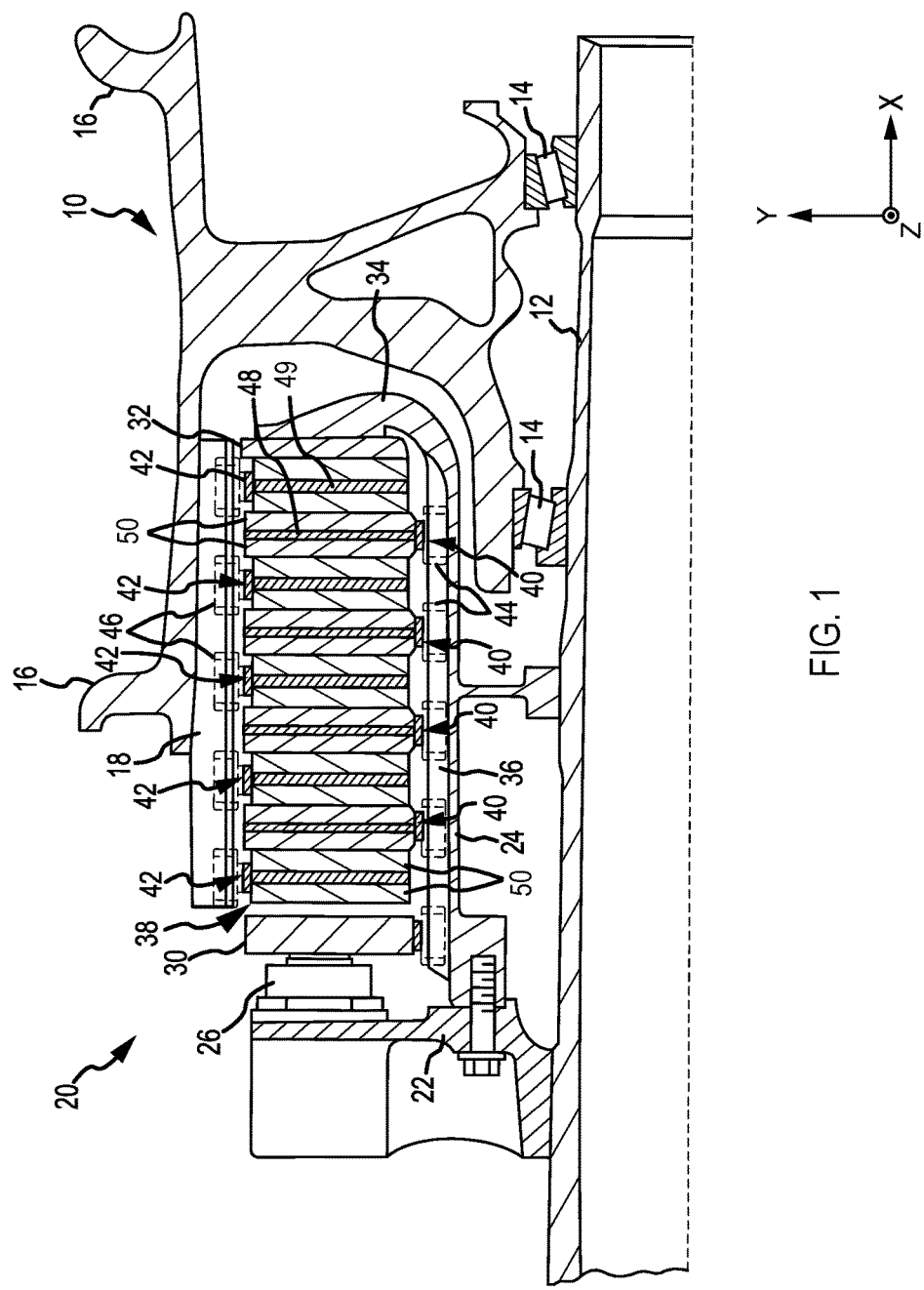

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Throughout the present disclosure, like reference numbers denote like elements. Accordingly, elements with like element numbering may be shown in the figures, but may not necessarily be repeated herein for the sake of clarity. Cross hatching lines may be used throughout the figures to denote different parts, but not necessarily to denote the same or different materials.

In the case of components that rotate about a common axis, a first component that is "radially outward" of a second component means that the first component is positioned at a greater distance away from the common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component.

Friction disks, including rotors, stators, and wear liners, are disclosed. The friction disks may include a friction disk core with wear liners coupled to the friction disk core. The wear liners may comprise a plurality of integrated torque buttons protruding from a non-wear surface. The wear liners may be coupled to the friction disk core via a fastener and may be positioned to provide frictional contact with the core and/or an adjacent friction disks during braking. The wear liners may be used interchangeably between rotor and stator friction disks. In other words, the wear liners may be compatible with both rotor cores and stators cores. The interchangeability of the wear liners may simplify the friction disk manufacturing process and/or increase output by reducing assembly time. Additionally, the integrated torque buttons may allow a greater portion of the wear liner to be utilized thereby reducing material waste.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof described herein, and any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. Each friction disk 38 may comprise a friction disk core. The plurality of friction disks 38 includes at least one friction disk with a non-rotatable core, also known as a stator 40, and at least one friction disk with a rotatable core, also known as a rotor 42. Stators 40 and rotors 42 may be located adjacent to one another in multi-disk brake system 20, forming a plurality of adjacent stator-rotor pairs. Stators 40 may comprise a stator core 48 and wear liners 50. Rotors 42 may comprise a rotor core 49 and wear liners 50. Each friction disk 38 includes an attachment structure. In the embodiment of FIG. 1, each of the four stators 40 includes a plurality of stator lugs 44 at circumferentially spaced positions around stator 40 as an attachment structure. Similarly, each of the five rotors 42 includes a plurality of rotor lugs 46 at circumferentially spaced positions around rotor 42 as an attachment structure. In the embodiment of FIG. 1, pressure plate 30, end plate 32, and friction disks 38 are all annular structures made at least partially from a carbon composite material.

Torque flange 22 may be mounted to axle 12. Torque tube 24 is bolted to torque flange 22 such that reaction plate 34 is near an axial center of wheel 10. End plate 32 is connected to a surface of reaction plate 34 facing axially inward. Thus, end plate 32 is non-rotatable by virtue of its connection to torque tube 24. Stator splines 36 support pressure plate 30 so that pressure plate 30 is also non-rotatable. Stator splines 36 also support stators 40 via stator cores 48. Stator cores 48 engage stator splines 36 with gaps formed between stator lugs 44. Similarly, rotors 42 engage rotor splines 18 via rotor core 49 with gaps formed between rotor lugs 46. Thus, rotor cores 49 of rotors 42 are rotatable by virtue of their engagement with rotor splines 18 of wheel 10.

As shown in FIG. 1, rotors 42 with rotor cores 49 are arranged with end plate 32 on one end, pressure plate 30 on the other end, and stators 40 with stator cores 48 interleaved so that rotors 42 with rotor cores 49 are directly or indirectly adjacent to non-rotatable friction components. Pistons 26 are connected to torque flange 22 at circumferentially spaced positions around torque flange 22. Pistons 26 face axially toward wheel 10 and contact a side of pressure plate 30 opposite friction disks 38. Pistons 26 may be powered electrically, hydraulically, or pneumatically.

In various embodiments, in response to actuation of pistons 26, a force, towards reaction plate 34, is exerted on the rotatable friction disks 42 and the non-rotatable friction disks 40. The rotatable friction disks 42 and the non-rotatable friction disks 40 may thus be pressed together between pressure plate 30 and end plate 32.

Figure 2:
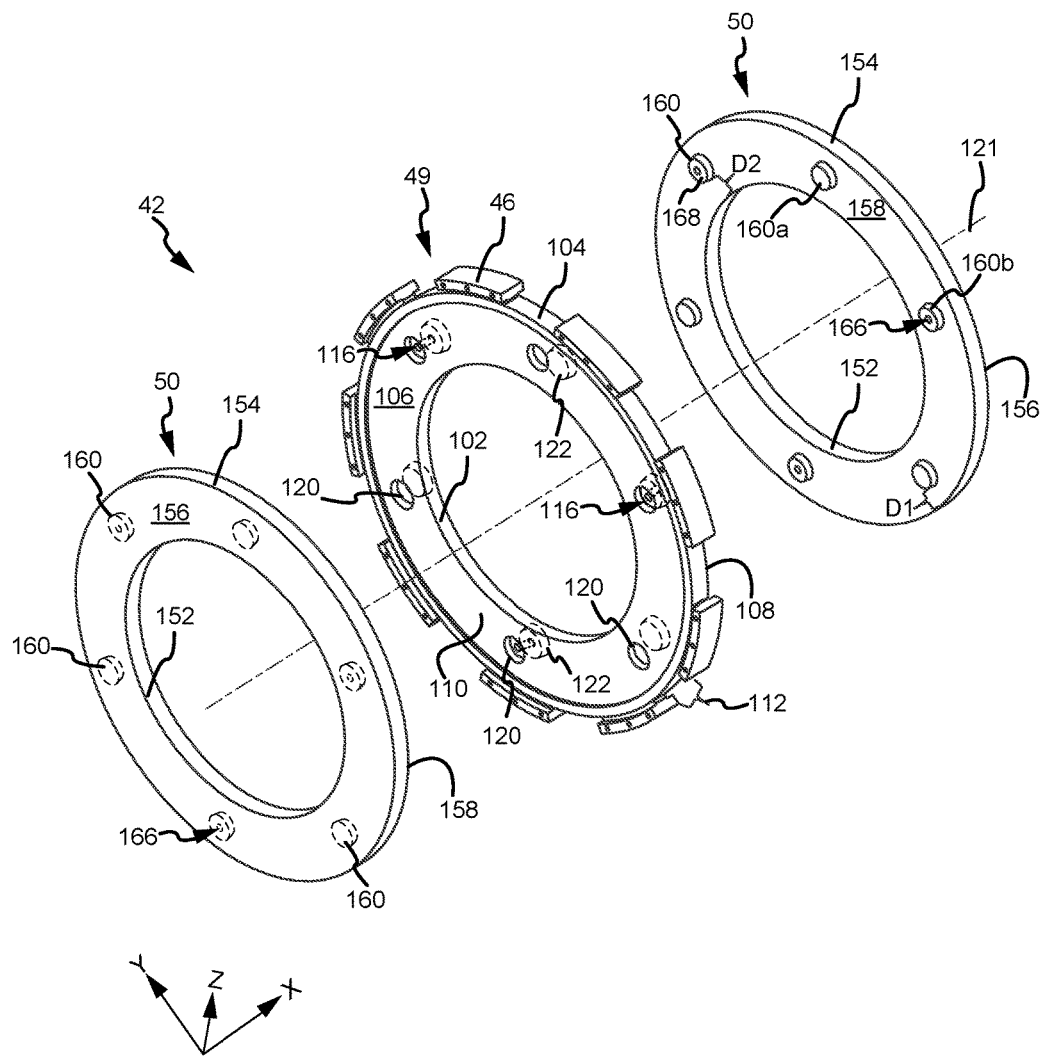
FIG. 2 illustrates an exploded view of a rotor having wear liners comprising integrated toque buttons, in accordance with various embodiments.

Referring to FIG. 2, an exploded view of rotor 42 comprising a friction disk core and wear liners having integrated torque buttons is illustrated, according to various embodiments. Rotor 42 may comprise rotor core 49 (also referred to as a friction disk core) and one or more wear liners 50 coupled to rotor core 49. Rotor core 49 and wear liners 50 may comprise different materials. For example, in various embodiments, rotor core 49 may comprise a first material such as steel, and wear liners 50 may comprise a second material such as a carbon composite material. However, in various embodiments, rotor core 49 and wear liners 50 may comprise the same material, such as a carbon composite material. In various embodiments, the material of rotor core 49 may be selected for its structural properties, thermal conductivity, heat capacity, and/or oxidation resistance properties. For example, rotor core 49 may comprise silicon carbide or titanium. In various embodiments, a material of wear liners 50 may be selected for its wear resistance and/or frictional properties. Thus, rotor 42 may contain the structural advantages of rotor core 49 and the frictional advantages of wear liners 50.

Wear liners 50 may comprise an inner circumferential surface 152 and an outer circumferential surface 154 radially outward of inner circumferential surface 152. Wear liners 50 may further include a wear surface 156 and a non-wear surface 158 opposite wear surface 156. Wear surface 156 may be substantially planar, or flat, in the YZ plane of xyz axis provided for reference, and may extend from inner circumferential surface 152 to outer circumferential surface 154. Non-wear surface 158 may extend from inner circumferential surface 152 to outer circumferential surface 154 and may be oriented toward rotor core 49. Non-wear surface 158 may include a plurality of torque buttons 160. Torque buttons 160 (also referred to as protrusions) may extend (i.e., protrude) from non-wear surface 158 in an axial direction (+/−x-direction) toward rotor core 49. Protrusion 160 may comprise a generally cylindrical or frustoconical shape. In various embodiments, with momentary combined reference to FIG. 4B and FIG. 2, the sidewalls 162 of protrusions 160 may be parallel to axis of rotation 121. For example, sidewalls 162 may be formed orthogonal to non-wear surface 158. In various embodiments, sidewalls 162 may be sloped. For example, sidewalls 162 may be formed at angle between 91° and 155° relative to non-wear surface 158 of wear liner 50.

With reference to FIG. 2, protrusions 160 may be located a distance D1 from outer circumferential surface 154 and a distance D2 from inner circumferential surface 152. In various embodiments, distance D1 may be about equal to distance D2. As used herein "about equal" means±0.02 inches (±0.05 cm). In various embodiments, distance D1 may be greater than distance D2. In various embodiments, distance D2 may be greater than distance D1. In various embodiments, protrusions 160 may be formed at varying locations such that distance D1 of a first protrusion 160a may be different from a distance D1 of a second protrusion 160b. In various embodiments, distance D1 and distance D2 may each be greater than or equal to 0.15 inches (0.38 cm). In various embodiments, distance D1 and distance D2 may each be greater than or equal to 0.25 inches (0.64 cm).

In various embodiments, protrusions 160 may be formed in a circumferentially symmetric configuration along non-wear surface 158 such that a circumferential distance between adjacent protrusions 160 is about equal for all protrusions 160. In various embodiments, protrusions 160 may be formed in a circumferentially asymmetric configuration along non-wear surface 158. For example, a circumferential distance between a first set of adjacent protrusions 160 may be different than a circumferential distance between a second set of adjacent protrusions 160. In various embodiments, the location and configuration of protrusions 160 may be selected to minimize vibration.

An opening 166 may be formed through one or more protrusions 160. Openings 166 may extend completely through wear liner 50, for example, openings 166 may extend from wear surface 156 to a surface 168 of protrusion 160 opposite wear surface 156. Openings 166 may include a counterbore and may be configured to receive a fastener, such as a rivet, bolt, pin, screw, or other suitable securement mechanism. For example, with momentary reference to FIG. 4A, the diameter of opening 166 proximate wear surface 156 may be greater than the diameter of opening proximate surface 168 of protrusion 160.

With reference to FIG. 2, rotor core 49 may comprise a rotor spine 110 and rotor lugs 46. Rotor core 49 may engage rotor splines 18 (FIG. 1) in rotor gaps 112 formed between rotor lugs 46. Thus, rotor 42 may be rotatable by virtue of the engagement between rotor lugs 46 of rotor core 49 and rotor splines 18 of wheel 10 (FIG. 1). Rotor core 49 may comprise an inner circumferential surface 102 and an outer circumferential surface 104 radially outward of inner circumferential surface 102. Rotor lugs 46 may be extend from outer circumferential surface 104. Rotor core 49 further comprises a first surface 106 and a second surface 108 opposite first surface 106. First surface 106 and second surface 108 may extend along rotor spine 110 between inner circumferential surface 102 and outer circumferential surface 104. A plurality of first depressions 120 may be formed in, and defined by, first surface 106. A plurality of second depressions 122 may be formed in, and defined by, second surface 108. A location of first depressions 120 may be selected to complement a location of second depressions 122. Stated another way, first depressions 120 may be formed axially adjacent second depressions 122. First depressions 120 and second depressions 122 may each be formed partially through rotor core 49 such that a portion of rotor core 49 remains between a bottom, or axially inward, surface of first depressions 120 and a bottom, or axially inward, surface of second depressions 122. Stated differently, a depth of first depressions 120 extending in the positive x-direction, and a depth of second depressions 122 extending in the negative x-direction may be selected such that a portion of rotor core 49 remains between axially aligned first depressions 120 and second depressions 122. In various embodiments, the depth of the first depressions 120 may be about equal to the depth of second depressions 122.

First depressions 120 and second depressions 122 may comprise a generally cylindrical or frustoconical shape. In various embodiments, with momentary reference to FIG. 4B, the sidewalls 126 of first depressions 120 and the sidewalls 128 of second depressions 122 may be parallel to axis of rotation 121 (FIG. 2). For example, sidewalls 126 may be formed orthogonal to bottom surface 130 of first depressions 120, and sidewalls 128 may be formed orthogonal to bottom surface 132 of second depressions 122. In various embodiments, sidewalls 126 of first depressions 120 and sidewalls 128 of second depressions 122 may be sloped. For example, sidewalls 126 may be formed at angle between 91° and 155° relative to bottom surface 130 of first depressions 120, and sidewalls 128 may be formed at angle between 91° and 155° relative to bottom surface 132 of second depressions 122.

With reference to FIG. 2, an opening 116 may be formed through one or more axially aligned first depressions 120 and second depressions 122. Openings 116 may extend completely through rotor core 49. For example, openings 116 may extend from the bottom, or axially inward, surface 130 (FIG. 4B) of first depressions 120 to the bottom, or axially inward, surface 132 (FIG. 4B) of second depressions 122. Openings 116 may be configured to receive a rivet or other fastener. Openings 116 may be located in first depressions 120 and second depressions 122 that are axially aligned with protrusions 160 having openings 166. In that regard, openings 116 may be configured to align axially with openings 166.

First depressions 120 and second depressions 122 may be formed and/or configured to complement protrusions 160. Accordingly, first depressions 120 and second depressions 122 may be formed in a circumferentially symmetric configuration along first surface 106 and second surface 108, respectively, or in a circumferentially asymmetric configuration along first surface 106 and second surface 108, respectively. A distance between inner circumferential surface 102 and first depressions 120 and between inner circumferential surface 102 and second depressions 122 and a distance between outer circumferential surface 104 and first depressions 120 and between outer circumferential surface 104 and second depressions 122 and may be selected such that protrusions 160 will axially align with first depressions 120 and second depressions 122.

Figure 3:
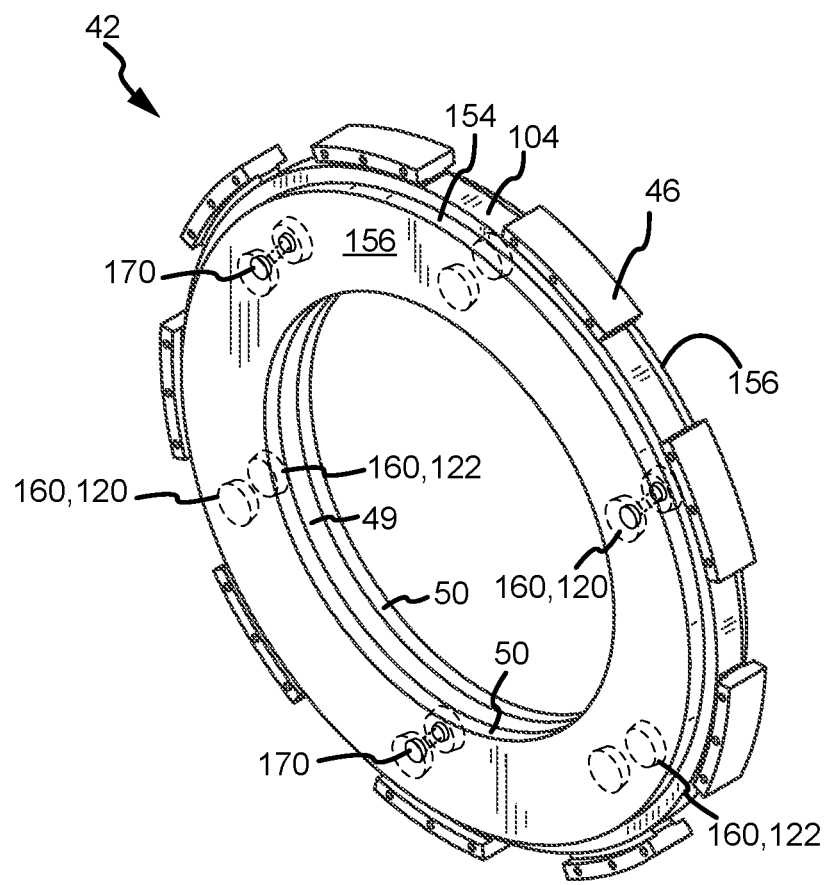
FIG. 3 illustrates a perspective view of an assembled rotor having wear liners comprising integrated toque buttons, in accordance with various embodiments.

Referring to FIG. 3, an assembled rotor 42 including wear liners 50 coupled to rotor core 49 is illustrated, according to various embodiments. Fasteners 170 may extend between opposing wear liners 50 and may couple wear liners 50 to rotor core 49. Wear surface 156 of wear liners 50 may be oriented away from rotor core 49. Outer circumferential surface 154 of wear liners 50 may disposed radially inward from outer circumferential surface 104 and rotor lugs 46 of rotor core 49. In this regard, a diameter of the outer circumferential surface 154 of wear liners 50 may be less than a diameter of the outer circumferential surface 104 of rotor core 49. Stated another way, with momentary reference to FIG. 4B, a length L1 extending from inner circumferential surface 152 to outer circumferential surface 154 of wear liners 50 may be less than a length L2 extending from inner circumferential surface 102 to outer circumferential surface 104 of rotor core 49.

With combined reference to FIG. 2 and FIG. 3, protrusions 160 of wear liners 50 may be located and/or positioned within first depressions 120 and second depressions 122. Stated differently, protrusions 160 of the wear liner 50 that is adjacent to first surface 106 of rotor core 49 may be positioned within first depressions 120, and protrusions 160 of the wear liner 50 that is adjacent to second surface 108 of rotor core 49 may be positioned with second depressions 122.

Figure 4A:
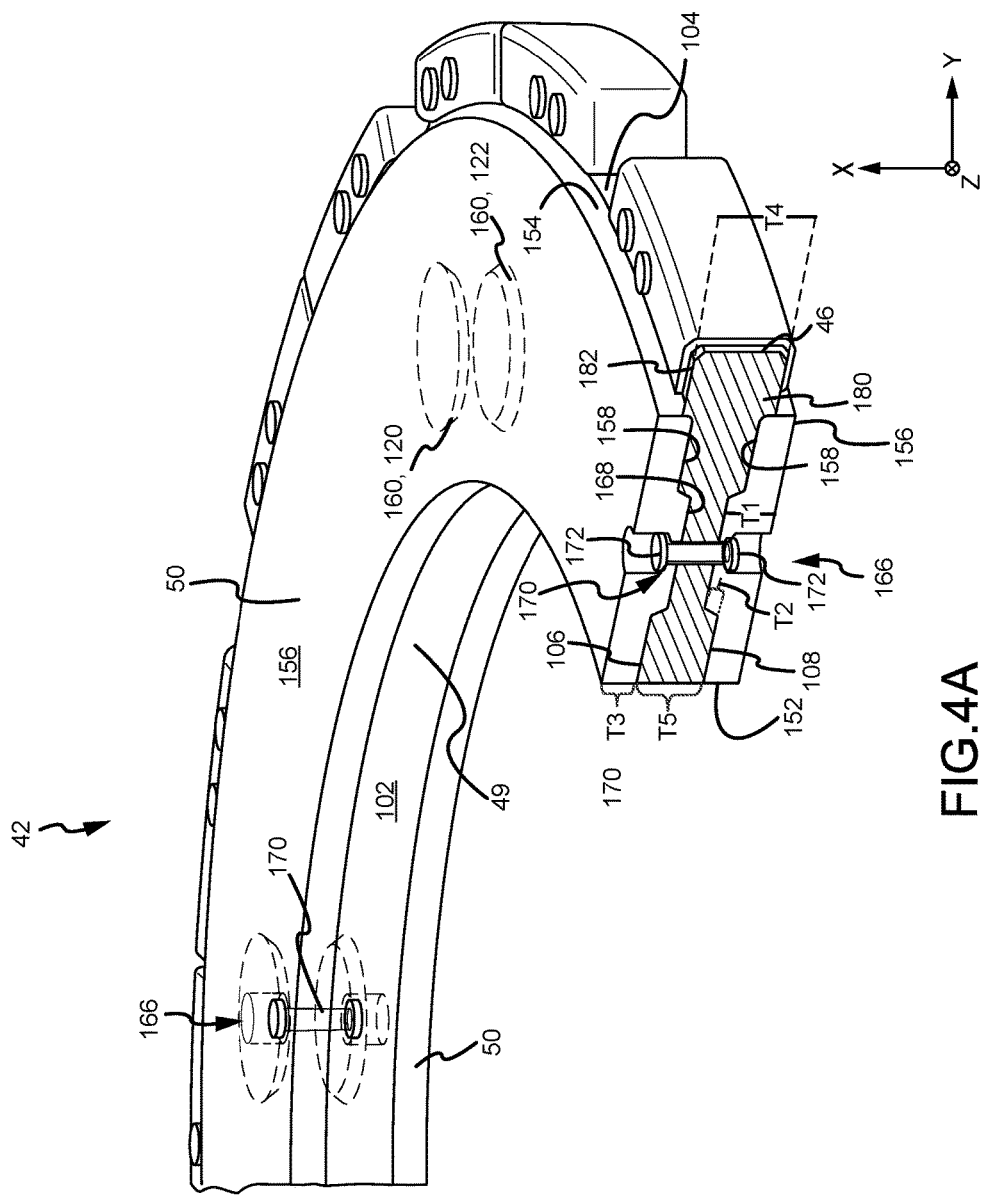
FIGS. 4A and 4B illustrate a cross-section view of a rotor having wear liners comprising integrated torque buttons in an unworn state and a worn state, respectively, in accordance with various embodiments.
Figure 4B:
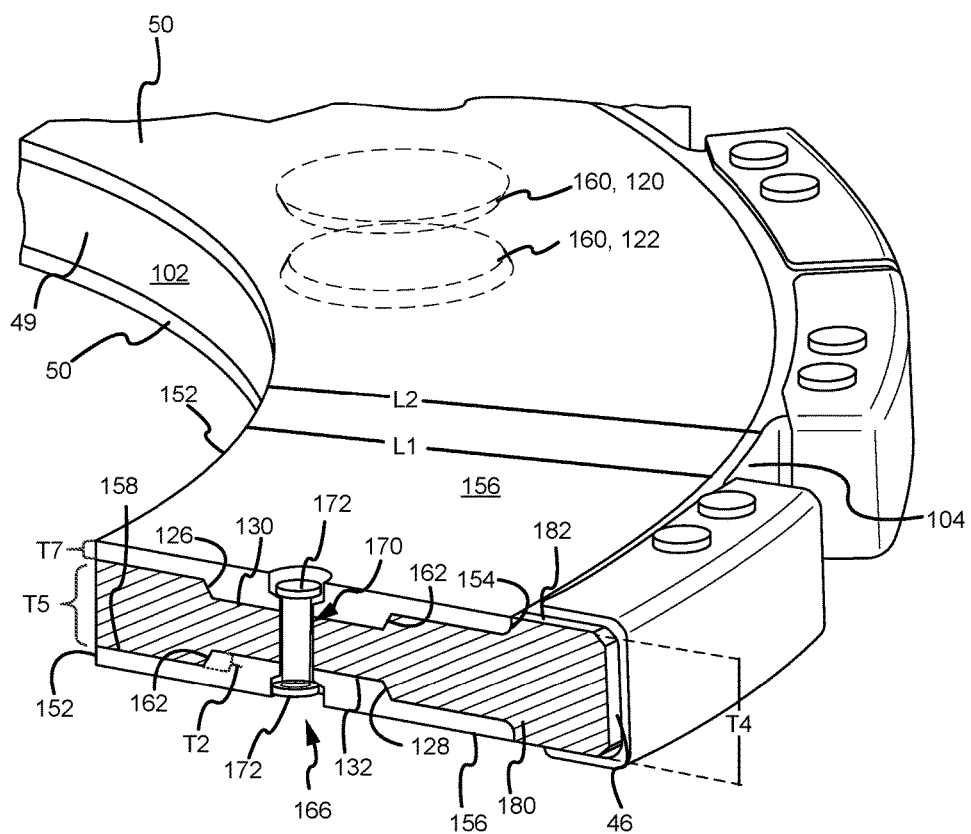

Referring to FIG. 4A, a cutaway view of rotor 42 having wear liners 50 in an unworn state is illustrated, according to various embodiments. Rotor 42 may comprise rotor core 49, wear liners 50, and fasteners 170. Fasteners 170 may extend between opposing wear liners 50 and may couple wear liners 50 to rotor core 49. Fasteners 170 may be located through openings 166 in protrusions 160 and openings 116 (FIG. 2) in rotor core 49. Heads 172 of fasteners 170 may be recessed with respect to wear surface 156 of wear liners 50. Locating fasteners 170 through protrusion 160 may allow the heads 172 of fasteners 170 to be located a greater distance from wear surface 156. In this regard, when wear liners 50 are in a fully worn state, as shown in FIG. 4B, heads 172 of fasteners 170 may remain recessed with respect to wear surface 156 of wear liners 50. By locating fasteners 170 through protrusions 160 a shorter fasteners (i.e., a fastener having a decreased axial length) may be used and an increased volume of material of wear liner 50 may be consumed before wear liner replacement.

Rotor core 49 may comprise a thickness T5 at inner circumferential surface 102 and along the contact area with non-wear surface 158 of wear liners 50. Rotor core 49 may comprise a thickness T4 at outer circumferential surface 104 and rotor lugs 46. In various embodiments, thickness T4 may be greater than thickness T5. Stated another way, a portion 180 of rotor core 49 that is radially outward of wear liners 50 and proximate to outer circumferential surface 104 and rotor lugs 46 may comprise a thickness T4 that is greater than the thickness T5 of a radially inward portion of rotor core 49 that is in contact with wear liners 50. In various embodiments, thickness T5 of rotor core 49 may be between 0.30 inches and 1.0 inches (i.e., between 0.76 cm and 2.54 cm). In various embodiments, thickness T5 of rotor core 49 may be between 0.40 inches and 0.75 inches (i.e., between 1.02 cm and 1.91 cm). In various embodiments, thickness T5 of rotor core 49 may be between 0.50 inches and 0.60 inches (i.e., between 1.27 cm and 1.52 cm).

Unworn wear liners 50 may comprise a thickness T3 at inner circumferential surface 152 and at outer circumferential surface 154. Thickness T3 may extend from an unworn wear surface 156 to non-wear surface 158. In various embodiments, unworn (i.e., new) wear liners 50 may comprise a thickness T3 between 0.20 inches and 1.0 inches (i.e., between 0.51 cm and 2.54 cm). In various embodiments, thickness T3 of unworn wear liners 50 may be between 0.25 inches and 0.6 inches (i.e., between 0.64 cm and 1.52 cm). In various embodiments, thickness T3 of unworn wear liners 50 may be between 0.25 inches and 0.35 inches (i.e., between 0.64 cm and 0.89 cm).

Protrusions 160 may include a thickness T2. Thickness T2 may extend from non-wear surface 158 to surface 168 of protrusions 160. In various embodiments, a depth of first depressions 120 and second depressions 122 is about equal to thickness T2. In various embodiments, thickness T2 may be between 0.050 inches and 0.20 inches (i.e., between 0.13 cm and 0.51 cm). In various embodiments, thickness T2 may be between 0.075 inches and 0.15 inches (i.e., between 0.19 cm and 0.38 cm). In various embodiments, thickness T2 may be between 0.090 inches and 0.11 inches (i.e., between 0.23 cm and 0.28 cm). Unworn wear liners 50 may comprise a thickness T1 at protrusions 160. Thickness T1 may extend from unworn wear surface 156 to surface 168 of protrusions 160. In other words, thickness T1 may be the sum of thickness T3 and thickness T2.

Referring to FIG. 4B, a cutaway view of rotor 42 having wear liners 50 in a fully worn state is illustrated, according to various embodiments. Rotor 42 may comprise rotor core 49, fully worn wear liners 50, and fasteners 170. Opposing heads 172 of fasteners 170 may be recessed with respect to worn wear surface 156 of wear liners 50.

Worn wear liners 50 may comprise a thickness T7 at inner circumferential surface 152 and at outer circumferential surface 154. Thickness T7 may extend from worn wear surface 156 to non-wear surface 158. In various embodiments, fully worn wear liners 50 may comprise a thickness T7 between 0.02 inches and 0.25 inches (i.e., between 0.05 cm and 0.64 cm). In various embodiments, thickness T7 of fully worn wear liners 50 may be between 0.05 inches and 0.15 inches (i.e., between 0.13 cm and 0.38 cm). In various embodiments, thickness T7 may be about equal to the difference in thickness between thickness T4 and thickness T5 of rotor core 49. Stated differently, wear surface 156 of fully worn wear liners 50 may be substantially coplanar with an axial surface 182 of the portion 180 of rotor core 49 that is radially outward from wear liners 50. As used herein "substantially coplanar" means within ±0.02 inches (±0.05 cm).

In various embodiments, wear liners 50 may be replaceable, such that after wear liners 50 have been worn below a suitable operational thickness, wear liners 50 may be removed from rotor core 49 and replaced by new or remanufactured wear liners. Wear liners 50 having protrusions 160 extending into first depressions 120 and second depressions 122, and fasteners 170 located through the protrusions 160, may allow a greater volume of wear liners 50 to be consumed (i.e. used, worn) prior to replacement, as compared to wear liners which may be attached at a flange and/or which do not include protrusions 160. In various embodiments, between 50% and 70% of a total material volume of unworn wear liners 50 may be consumed prior to wear liners 50 being replaced. In various embodiments, between 55% and 65% of the total material volume of unworn wear liners 50 may be consumed prior to wear liners 50 being replaced.

Figure 5:
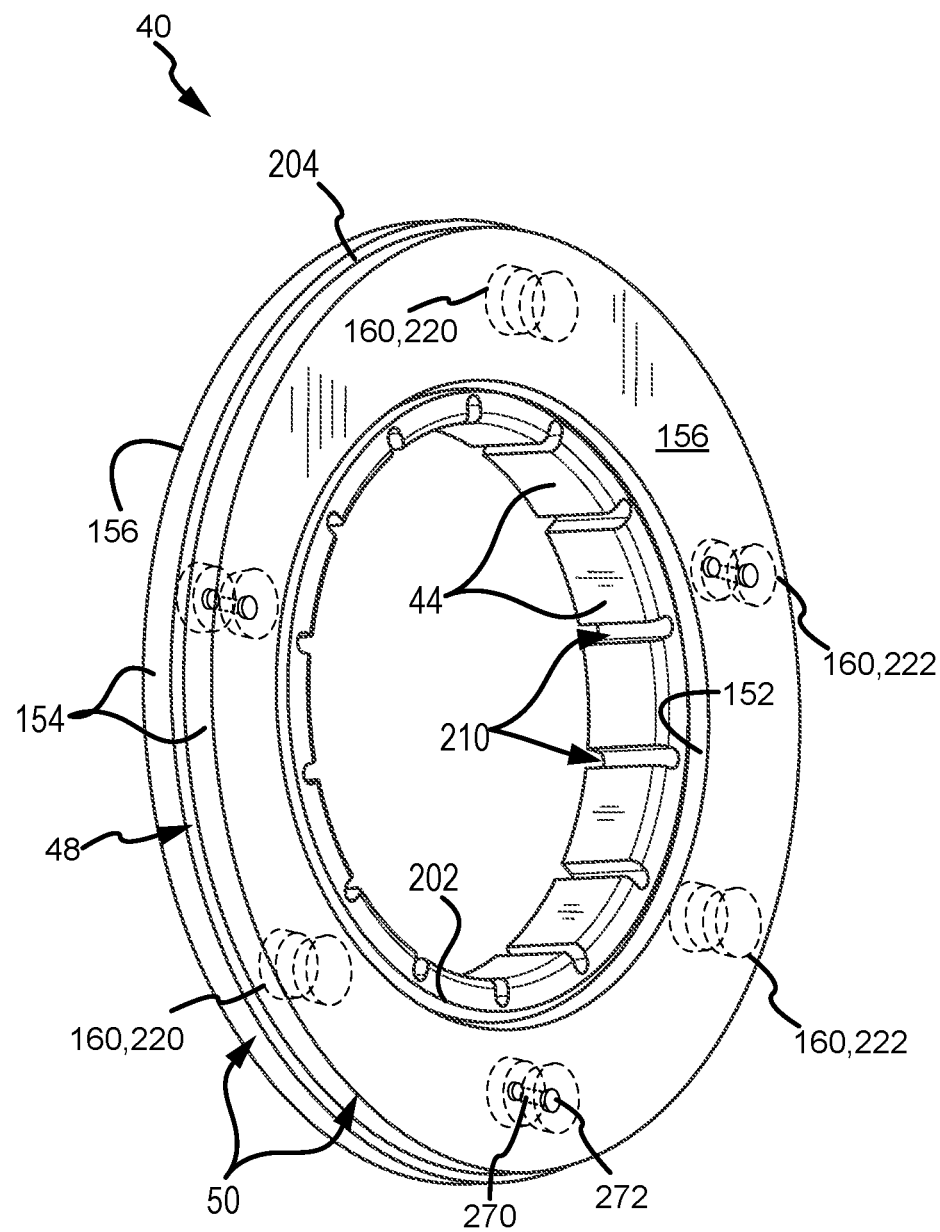
FIG. 5 illustrates a perspective view of an assembled stator having wear liners comprising integrated toque buttons, in accordance with various embodiments.

Referring to FIG. 5, a stator 40 comprising a friction disk core and wear liners having integrated torque buttons is illustrated, according to various embodiments. Stator 40 may comprise a stator core 48 and wear liners 50. Stator core 48 and wear liners 50 may comprise different materials. For example, in various embodiments, stator core 48 may comprise a first material such as steel, and wear liners 50 may comprise a second material such as a carbon composite material. However, in various embodiments, stator core 48 and wear liners 50 may comprise the same material, such as a carbon composite material. In various embodiments, the material of stator core 48 may be selected for its structural properties, thermal conductivity, heat capacity, and/or oxidation resistance properties. For example, stator core 48 may comprise silicon carbide or titanium. In various embodiments, a material of wear liners 50 may be selected for its wear resistance and/or frictional properties. Thus, stator 40 may contain the structural advantages of stator core 48 and the frictional advantages of wear liners 50.

Stator core 48 may comprise a spine and stator lugs 44. Stator gaps 210 may be located between stator lugs 44. Stator gaps 210 may be positioned to align with stator splines 36 (FIG. 1). The engagement between the stator splines 36 and stator lugs 44 may prevent stator core 48 from rotating in response to a torque being applied to stator 40 during braking. Stator core 48 may comprise an inner circumferential surface 202 and an outer circumferential surface 204 radially outward of inner circumferential surface 202. Stator lugs 44 may be extend from inner circumferential surface 202.

Stator core 48 may include opposing first and second surfaces extending between inner circumferential surface 202 and outer circumferential surface 204. A plurality of first depressions 220 may be formed in the first surface of stator core 48. A plurality of second depressions 222 may be formed in the second surface of stator core 48. A location of first depressions 220 may be selected to complement a location of second depressions 222. Stated another way, first depressions 220 may be formed axially adjacent second depressions 222. First depressions 220 and second depressions 222 may each be formed partially through stator core 48 such that a portion of stator core 48 remains between a bottom, or axially inward, surface of first depressions 220 and a bottom, or axially inward, surface of second depressions 222. In various embodiments, the depth of the first depressions 220 may be about equal to the depth of second depressions 222.

Wear liners 50 may be coupled to stator core 48 with wear surface 156 oriented away from stator core 48. Stated differently, wear liners 50 may be coupled to stator core 48 with non-wear surface 158 and protrusions 160 oriented toward stator core 48. Fasteners 270, similar to fasteners 170 in FIG. 4A, may couple wear liners 50 to stator core 48. Fasteners 270 may extend between opposing wear liners 50 and may be located in one or more protrusions 160. Opposing heads 272 of fasteners 270 may be recessed with respect to wear surface 156 of wear liners 50. Disposing fasteners 270 through protrusions 160 may allow fasteners 270 to be located greater distance from wear surface 156, which may allow for a shorter fastener (i.e., a fastener having a decreased axial length). In this regard, when wear liners 50 are in a fully worn state, heads 272 of fasteners 270 may remain recessed with respect to wear surface 156 of wear liners 50. Locating fasteners 270 through protrusions 160, may increase the volume of material of wear liner 50 that may be consumed before wear liner replacement.

Inner circumferential surface 152 of wear liners 50 may be disposed radially outward from inner circumferential surface 202 of stator core 48 such that wear liners 50 may not be in contact with stator lugs 44. Stated another way, wear liners 50 may terminate prior to inner circumferential surface 202 and/or stator lugs 44. In this regard, with momentary combined reference to FIG. 4B and FIG. 5, length L1 of wear liners 50 may be less than a length extending from inner circumferential surface 202 to outer circumferential surface 204 of stator core 48. In various embodiments, fully worn wear liners 50 coupled to stator core 48 may comprise a thickness between 0.02 inches and 0.25 inches (i.e., between 0.05 cm and 0.64 cm). In various embodiments, a thickness of fully worn wear liners 50 may be between 0.05 inches and 0.15 inches (i.e., between 0.13 cm and 0.38 cm). In various embodiments, wear surface 156 of fully worn wear liners 50 may be substantially coplanar with an axial surface of a portion of stator core 48 that is radially inward from wear liners 50. As used herein "substantially coplanar" means within ±0.02 inches (±0.05 cm).

Returning to FIG. 5, protrusions 160 of wear liners 50 may be located and/or positioned in first depressions 220 and second depressions 222. Stated differently, protrusions 160 of the wear liner 50 that is adjacent to the first surface of stator core 48 may be positioned within first depressions 220, and protrusions 160 of the wear liner 50 that is adjacent to the second surface of stator core 48 may be positioned within second depressions 222. First depressions 220 and second depressions 222 may be formed and/or configured to complement protrusions 160. Accordingly, first depressions 220 and second depressions 222 may be formed in a circumferentially symmetric configuration or in a circumferentially asymmetric configuration. A distance between inner circumferential surface 202 and first depressions 220 and between inner circumferential surface 202 and second depressions 222 and a distance between outer circumferential surface 204 and first depressions 220 and between outer circumferential surface 204 and second depressions 222 may be selected such that first depressions 220 and second depressions 222 axially align with protrusions 160.

In various embodiments, with combined reference to FIG. 3 and FIG. 5, each wear liner 50 may have an identical or substantially similar configuration, and first depressions 120 and second depression 122 of rotor core 49 and first depressions 220 and second depressions 222 of stator core 48 may have an identical or substantially similar configuration, which complements the configuration of protrusions 160. The similar depression configuration of rotor core 49 and stator core 48 may enable wear liners 50 to be interchangeable between rotor core 49 and stator core 48. Additionally, coupling wear liners 50 via fasteners 170, 270 located through protrusions 160, as opposed to via a flange at an inner diameter or outer diameter of the friction disk, enables wear liners 50 to be interchangeable between rotor core 49 and stator core 48, as the wear liners 50 are coupled independent of rotor lugs 46 and stator lugs 44. In other words, wear liners 50 may be compatible with both rotors 42 and stators 40. The interchangeability of wear liners 50 may simplify the friction disk manufacturing process and/or increase output by reducing assembly time.

Figure 6:
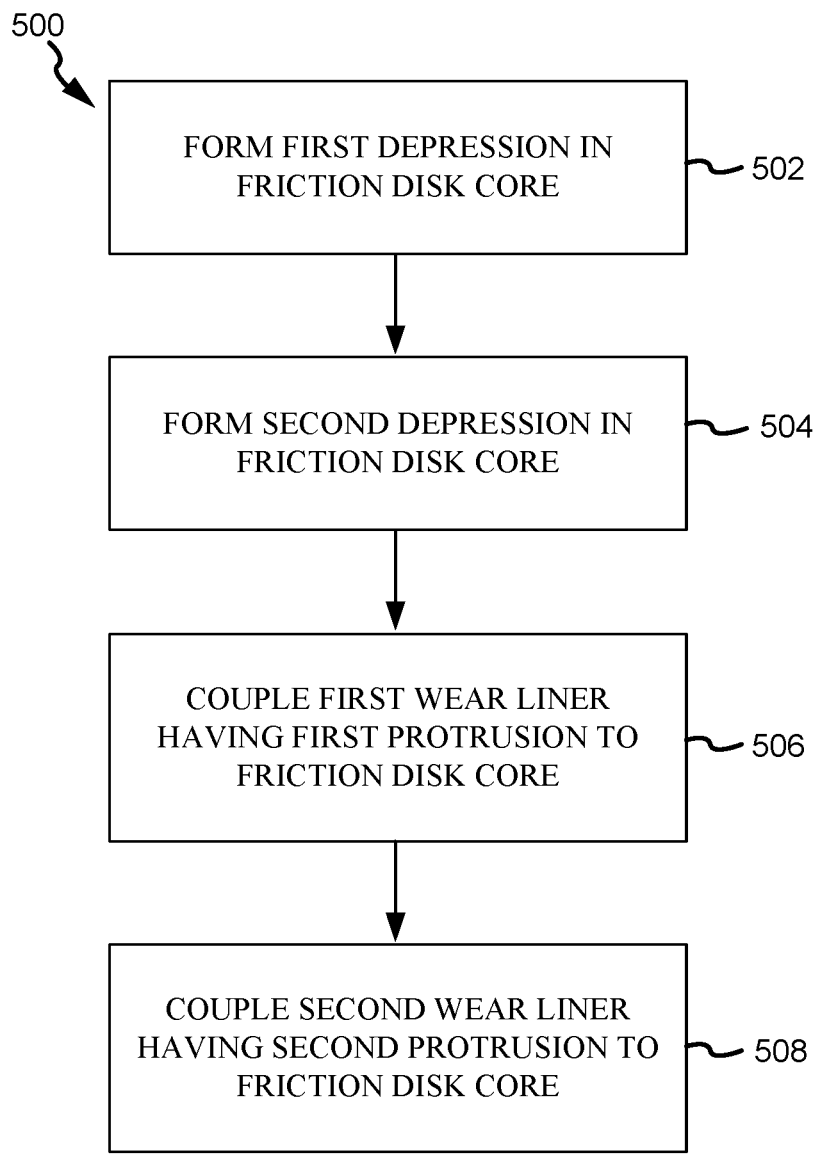
FIG. 6 illustrates a method of making a friction disk, in accordance with various embodiments.

With reference to FIG. 6, a method 500 of making a friction disk is shown, in accordance with various embodiments. Method 500 may comprise forming a first depression in a first surface of a friction disk core (step 502), forming a second depression in a second surface of a friction disk core opposite the first surface (step 504), coupling a first wear liner comprising a first protrusion to the friction disk core with the first protrusion positioned in the first depression (step 506), and coupling a second wear liner comprising a second protrusion to the friction disk core with the second protrusion positioned within the second depression (step 508).

In various embodiments, with combined reference to FIG. 4A and FIG. 6, step 502 may comprise forming first depression 120 in first surface 106 of friction disk core 49. Step 504 may include forming second depression 122 in second surface 108 of friction disk core 49. Step 506 may including coupling a first wear liner 50 comprising first protrusion 160 to friction disk core 49 with first protrusion 160 positioned in first depression 120. First protrusion 160 may extend from first non-wear surface 158. Step 508 may include coupling a second wear liner 50 comprising second protrusion 160 to friction disk core 49 with second protrusion 160 positioned within second depression 122. Second protrusion 160 may extend from second non-wear surface 158. In various embodiments, coupling the first and second wear liners 50 to the friction disk core (steps 506 and 508) may include disposing fastener 170 through the first protrusion 160 and second protrusion 160. A first head 172 of fastener 170 may be recessed with respect to first wear surface 156 of the first wear liner 50 and a second head 172 of fastener 170 may be recessed with respect to second wear surface 156 of the second wear liner 50.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A friction disk comprising:
a friction disk core comprising a first depression in a first surface of the friction disk core and a second depression in a second surface of the friction disk core opposite the first surface, wherein the first depression is axially aligned with the second depression, and wherein a portion of the friction disk core is located between the first depression and the second depression;
a first wear liner coupled to the first surface of the friction disk core and comprising a first protrusion extending from a first non-wear surface of the first wear liner, wherein the first protrusion is positioned within the first depression;
a second wear liner coupled to the second surface of the friction disk core and comprising a second protrusion extending from a second non-wear surface of the second wear liner, wherein the second protrusion is positioned within the second depression; and
a fastener extending from the first wear liner to the second wear liner, wherein the fastener is located through the first protrusion and the second protrusion, and wherein a first head of the fastener is recessed with respect to a first wear surface of the first wear liner and a second head of the fastener opposite the first head is recessed with respect to a second wear surface of the second wear liner.

2. The friction disk of claim 1, wherein a sidewall of the first protrusion is formed at angle between 90° and 155° relative to the first non-wear surface.

3. The friction disk of claim 1, wherein the friction disk core comprises a first material, and the first wear liner comprises a second material different from the first material.

4. The friction disk of claim 1, wherein the friction disk core comprises a rotor core.

5. The friction disk of claim 1, wherein a thickness of the first wear liner extending from the first wear surface to the first non-wear surface is between 0.05 inches and 0.15 inches.

6. The friction disk of claim 1, wherein the friction disk core comprises a stator core.

7. A multi-disk brake system comprising:
a first friction disk comprising:
a first friction disk core comprising a plurality of first rotor disk depressions in a first surface of the first friction disk core and a plurality of second rotor disk depressions in a second surface of the first friction disk core, wherein a portion of the first friction disk core is located axially between the plurality of first rotor disk depressions and the plurality of second rotor disk depressions, and wherein a radially outward portion of the first friction disk core comprises a thickness that is greater than a thickness of a radially inward portion of the first friction disk core,
a first rotor disk wear liner coupled to the first surface of the first friction disk core and comprising a plurality of first rotor disk protrusions extending from a first non-wear surface of the first rotor disk wear liner, the plurality of first rotor disk protrusions positioned within the plurality of first rotor disk depressions,
a second rotor disk wear liner coupled to the second surface of the first friction disk core and comprising a plurality of second rotor disk protrusions extending from a second non-wear surface of the second rotor disk wear liner, the plurality of second rotor disk protrusions positioned within the plurality of second rotor disk depressions, wherein the radially outward portion of the first friction disk core is radially outward of the first rotor disk wear liner and the second rotor disk wear liner, and wherein the radially inward portion of the first friction disk core is contacting the first non-wear surface of the first rotor disk wear liner and the second non-wear surface of the second rotor disk wear liner, and
a fastener extending from the first rotor disk wear liner to the second rotor disk wear liner, wherein the fastener is located through a first protrusion of the plurality of first rotor disk protrusions and a second protrusion of the plurality of second rotor disk protrusions; and
a second friction disk comprising:
a second friction disk core comprising a plurality of second depressions in a surface of the second friction disk core, and
a second wear liner coupled to the surface of the second friction disk core and comprising a plurality of second protrusions extending from a non-wear surface of the second wear liner, the plurality of second protrusions positioned within the plurality of second depressions.

8. The multi-disk brake system of claim 7, wherein a first head of the fastener is recessed with respect to a first wear surface of the first rotor disk wear liner, and wherein a second head of the fastener is recessed with respect to a second wear surface of the second rotor disk wear liner.

9. The multi-disk brake system of claim 7, wherein the plurality of first rotor disk protrusions is formed in a circumferentially symmetric configuration along the first non-wear surface.

10. The multi-disk brake system of claim 7, wherein the radially outward portion of the first friction disk core is located radially outward from an outer circumferential surface of the first rotor disk wear liner.

11. The multi-disk brake system of claim 10, wherein a portion of the second friction disk core is located radially inward from an inner circumferential surface of the second wear liner.

12. The multi-disk brake system of claim 11, wherein the first friction disk comprises a rotor and the second friction disk comprises a stator, and wherein the first rotor disk wear liner and the second wear liner can be interchanged between the first friction disk core and the second friction disk core.

13. The multi-disk brake system of claim 7, wherein a usable material volume of the first rotor disk wear liner is between 50% and 70% of a total material volume of the first wear liner in an unworn state.

14. A method of making a friction disk, comprising:
forming a first depression in a first surface of a friction disk core;
forming a second depression in a second surface of the friction disk core opposite the first surface of the friction disk core, wherein a portion of the friction disk core is located axially between the first depression and the second depression;
locating a first wear liner over the first surface of the friction disk core, the first wear liner comprising a first protrusion extending from a first non-wear surface of the first wear liner and positioned within the first depression, wherein a first portion of the friction disk core contacts the first non-wear surface and a second portion of the friction disk is located at least one of radially outward or radially inward from the first wear liner, and wherein a thickness of the second portion is greater than a thickness of first portion;
locating a second wear liner over the second surface of the friction disk core, the second wear liner comprising a second protrusion extending from a second non-wear surface of the second wear liner and positioned within the second depression; and
disposing a fastener through the first protrusion and the second protrusion.

15. The method of claim 14, wherein a first head of the fastener is recessed with respect to a first wear surface of the first wear liner, and wherein a second head of the fastener opposite the first head of the fastener is recessed with respect to a second wear surface of the second wear liner.

\* \* \* \* \*